United States Patent [19]
Cataldo

[11] Patent Number: 5,563,601
[45] Date of Patent: Oct. 8, 1996

[54] TWO-PORT SYNTHETIC APERATURE RADAR SYSTEM FOR RADAR DETECTION OF TARGETS

[75] Inventor: Thomas J. Cataldo, Commack, N.Y.

[73] Assignee: Northrop Grumman Corporation., Los Angeles, Calif.

[21] Appl. No.: 766,309

[22] Filed: Aug. 16, 1985

[51] Int. Cl.$^6$ .................................................. G01S 13/90
[52] U.S. Cl. ............................... 342/25; 342/28; 342/113; 342/115; 342/159
[58] Field of Search ..................... 343/5 CM, 5 FT, 343/55 A; 342/27–28, 25, 159–164, 99, 1–4, 25, 185, 104, 113, 115; 364/516, 517

[56] References Cited

U.S. PATENT DOCUMENTS

| | | | |
|---|---|---|---|
| 3,463,588 | 8/1969 | Meyerand, Jr. et al. | 342/159 X |
| 3,665,463 | 5/1972 | Kubanoff | 342/27 |
| 3,706,990 | 12/1972 | Carre | 343/7.7 |
| 3,735,400 | 5/1973 | Sletten et al. | 343/5 C MX |
| 3,787,849 | 1/1974 | Sletten et al. | 343/7.7 |
| 3,787,863 | 1/1974 | Watanabe, et al. | 343/424 |
| 3,877,011 | 4/1975 | Holberg, et al. | 343/7.7 |
| 3,967,283 | 6/1976 | Clark et al. | 342/28 |
| 3,975,734 | 8/1976 | Payne | 343/7.7 |
| 3,993,994 | 11/1976 | Goggins | 343/5 CM |
| 4,017,859 | 4/1977 | Medwin | 343/383 |
| 4,034,373 | 7/1977 | de Pierre et al. | 343/7.7 |
| 4,053,885 | 10/1977 | Tomita et al. | 343/7.7 |
| 4,086,590 | 4/1978 | Goggins, Jr. | 343/5 CM |
| 4,101,890 | 7/1978 | Goyard | 343/8 |
| 4,112,430 | 9/1978 | Ladstatter | 343/368 |
| 4,132,990 | 1/1979 | Di Domizio et al. | 343/7 A |
| 4,137,533 | 1/1979 | Briechle et al. | 343/7.7 |
| 4,150,376 | 4/1979 | Blythe et al. | 343/7.7 |
| 4,204,655 | 5/1980 | Gulick et al. | 244/3.19 |
| 4,217,583 | 8/1980 | Hiller et al. | 343/7.7 |
| 4,217,585 | 8/1980 | Fishbein et al. | 343/7.7 |
| 4,225,864 | 9/1980 | Lillington | 343/7.7 |
| 4,249,179 | 2/1981 | Kolacny | 343/7 A |
| 4,271,412 | 6/1981 | Glass et al. | 343/5 FT |
| 4,321,601 | 3/1982 | Richman | 343/5 CM |
| 4,547,803 | 10/1985 | Richards | 342/185 X |
| 4,549,184 | 10/1985 | Boles et al. | 343/5 CM X |
| 4,559,537 | 12/1985 | Pearson, Jr. et al. | 342/99 |
| 4,606,848 | 8/1986 | Bond | 342/3 X |

FOREIGN PATENT DOCUMENTS 2054310  2/1981  United Kingdom ........... G01S 13/52

OTHER PUBLICATIONS

M. Skolnik, *Radar Handbook*; (McGraw–Hill, 1970), pp. 23–24.

Primary Examiner—Bernarr E. Gregory
Attorney, Agent, or Firm—Terry J. Anderson; Karl J. Hoch, Jr.

[57] ABSTRACT

Doppler signals from a two-port radar system are spectrally processed and searched for a pattern of points wherein clutter at a first instant of time is subsequently replaced by low-level returns indicating the movement of a target. The rate of change of the low-level signals, along the same range bin but different Doppler bins, is indicative of target azimuth position relative to the boresight of the radar antenna. The difference between the total Doppler detected from the target and the Doppler for the azimuth position of the black hole detection is the Doppler for the relative radial velocity of the target. Not only is the black hole and shadow (lack of detection) detectable but more measurable and detectable is the clutter signal difference with the target motion.

5 Claims, 7 Drawing Sheets

PORT 1
CLUTTER ONLY

BEFORE FFT   AFTER FFT

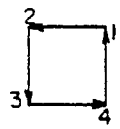 

*FIG. 1A*

PORT 2
CLUTTER ONLY

BEFORE FFT   AFTER FFT

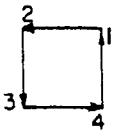 

*FIG. 2A*

1st MOVER ONLY          2nd MOVER ONLY          1st MOVER ONLY            2nd MOVER ONLY

BEFORE  AFTER    BEFORE  AFTER    BEFORE   AFTER      BEFORE    AFTER
 FFT     FFT      FFT     FFT      FFT      FFT        FFT       FFT

 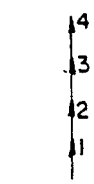      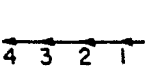   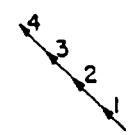

1st MOVER        2nd MOVER                                      2nd MOVER
PLUS CLUTTER     PLUS CLUTTER                                   PLUS CLUTTER
AFTER FFT        AFTER FFT                                      AFTER FFT

↑M              ↑M         1st MOVER                            M
                              PLUS CLUTTER
                              AFTER FFT
   ↑C              ↑C         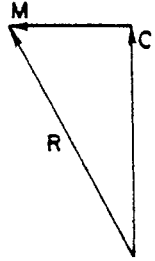               

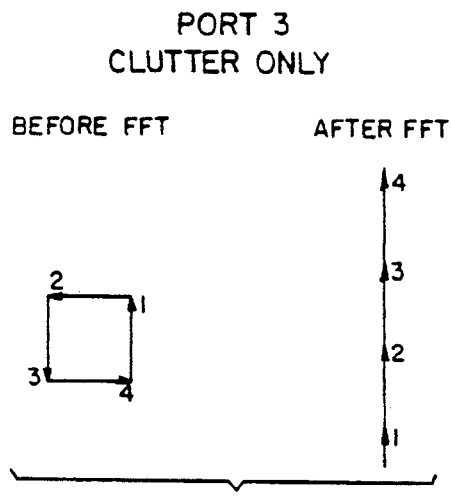
FIG. 3A  PORT 3 CLUTTER ONLY
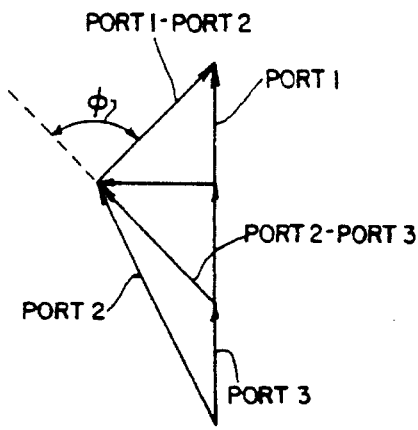
FIG. 4
MOVER AT BORESIGHT OF ANTENNA
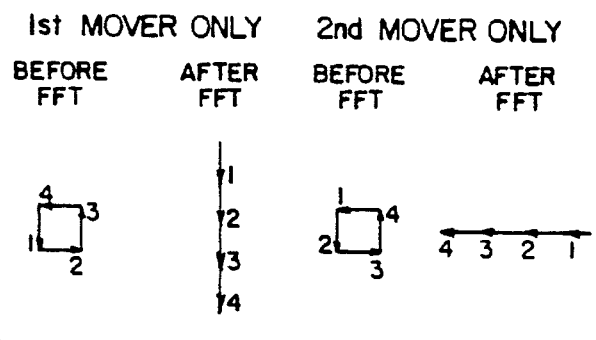
FIG. 3B  1st MOVER ONLY
FIG. 3C  2nd MOVER ONLY
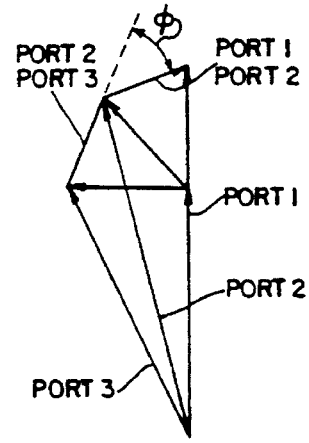
FIG. 5
MOVER OFF BORESIGHT OF ANTENNA
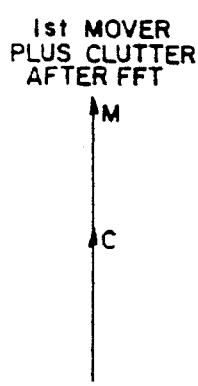
FIG. 3D  1st MOVER PLUS CLUTTER AFTER FFT
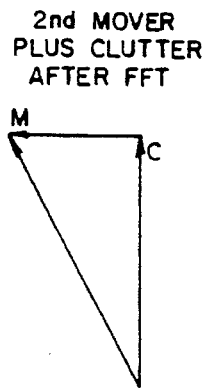
FIG. 3E  2nd MOVER PLUS CLUTTER AFTER FFT 5,563,601

TWO-PORT SYNTHETIC APERATURE RADAR SYSTEM FOR RADAR DETECTION OF TARGETS

FIELD OF THE INVENTION

The present invention relates to a radar system and more particularly to a two-antenna (port) synthetic aperture system that attains detection of a target and determines its relative radial velocity and angular position from digital signal processing of the radar returns.

BACKGROUND OF THE INVENTION

Three radar antennas or ports, employing three simultaneously synthetic aperture arrays, have been used for clutter suppression interferometry. Each port is motion compensated for each radar transmitted pulse. The motion of the radar platform is matched to the antenna spacings in a manner such that, at the occurrence of each radar-transmitted pulse, the antenna moves exactly one antenna spacing. Therefore, in a three-port system, the last two antenna ports receive radar return data at the previous antenna position for three successive transmitted pulses. Phase compensation may be employed if positions are not exactly equal to the antenna spacing. Assuming exact spacing for three successively transmitted pulses, each antenna port occupies the same position in space; and three radar clutter returns from the ground will have the same amplitude and phase, but objects moving on the ground (movers) will have different positions and consequently will customarily have a different amplitude and phase.

In a prior art three-port system, data from each antenna port is spectrally processed utilizing a well-known Fast Fourier Transform (FFT). During a particular time interval there are "N" transmitted pulses and "M" range bins. In each range bin the "N" returns are spectrally processed in each antenna port. In each range bin of each port there are "N" Doppler bin outputs. The Doppler bin outputs correspond to the Doppler signals detected at each antenna port. The outputs from antenna ports 1 and 2 are subtracted so that in a particular range bin the corresponding Doppler bin output of port 2 is subtracted from that of port 1. If there are no movers, but just clutter, the subtraction will theoretically equal zero signifying no mover present. By subtracting the output signal vectors from the three ports, a phase angle is obtained which is proportional to the relative radial velocity of a target (mover) and is determinative of target true azimuth position.

In a simplified system of the prior art, three ports (antennas) may be considered as being spaced along a platform on a moving vehicle, such as an aircraft. Each of the ports radiates electromagnetic energy and, as the three ports move relative to a target, such as a ground based target, the second and third ports will see identical ground clutter. However, if there is a moving target on the ground (mover), there will be a displacement of the target when the second port arrives at the physical position that the first port occupied an instant before. This displacement also occurs for the detected signal by the third port when it moves to the position occupied by the second port an instant before. The displacement of such a mover results in phase shift of processed signals at the individual ports, which corresponds to relative radial velocity and the true target azimuth position, as will be now discussed in connection with the figures.

FIG. 1A–FIG. 5 indicate the three-port vector diagram technique for determining relative radial velocity of a mover. These diagrams, for purposes of illustration, have been simplified in a number of aspects to show the theory of operation.

What is shown is only four transmitted pulses per antenna port, instead of the hundreds that would actually be processed in a practical system. The spectrally processed signals from the four returns are vectorally added in a filter that is matched to an equivalent frequency. Because the antenna motion is compensated for in each port, the clutter in a particular Doppler bin is the same in all ports. Thus, by way of example, if the signal at the second port were subtracted from that at the first port, or if the signal at the third port were subtracted from the second port, with only clutter present, the subtraction process would yield a null. Therefore, as indicated in FIG. 1A–FIG. 3A, the clutter ground returns for the illustrated four transmitted pulses per antenna, in all three ports, look exactly alike in all corresponding range Doppler bins.

Referring to FIG. 1B, the return signals are vectorally represented for the case of a first mover in the absence of clutter, before and after spectral processing (FFT). As indicated, the signals from the first mover at the first port have the same spectral lines as clutter at that port. To view this another way, since the first mover occupies the same range Doppler bin as the clutter in port 1, the ground returns appear identical. Considering FIGS. 2A and 2B, return signals from the first mover at the second port are phase shifted by 90° per pulse when compared with the return signals of clutter at port 2. The first mover in port 2 is phase shifted with respect to the first mover in port 1 as is apparent from the returns of FIGS. 1B and 2B. It is this phase difference as detected by adjacent ports of an antenna, in response to a moving target, which is employed to determine relative radial velocity of the first mover. Inasmuch as the clutter is considered, it has no phase shift between ports. Similarly, in port 3 the first mover has a phase shift relative to the first mover in port 2, in the same Doppler bin, as is apparent from the vector diagrams of FIGS. 2B and 3B. FIGS. 1C, 2C and 3C illustrate corresponding vector diagrams for a second mover which has a different radial velocity.

In FIGS. 1D, 2D and 3D the resultant of the first mover ground return plus the clutter return is vectorally represented by respective vectors M and C. Similarly, the cumulative vector effect of the second mover and clutter is indicated in FIGS. 1E, 2E and 3E. As will be observed in FIGS. 2D, 2E, 3D and 3E, phase shift in the second and third port signals occurs for the first and second mover vectors relative to the clutter vector due to the motion of the mover. In other words, as an antenna platform moves relative to a target, the second port will see a displaced target when that port occupies the position in space that the first port occupied an instant previously. Similarly, when the third port occupies the position in space which the second port occupied an instant previously, it will see the target displaced from the position it previously had, all of which results in the phase shift of the mover vector relative to the clutter vector.

In FIG. 4 the vector diagram is illustrated for the determination of relative radial velocity of a first mover. The vector diagram in FIG. 4 indicates each of the resultant vectors from ports 1–3 previously explained in connection with FIGS. 1D, 2D and 3D. These are respectively indicated in FIG. 4 as the vectors for ports 1, 2 and 3. Each of these vectors is not drawn to the same scale as FIGS. 1D, 2D and 3D but rather are drawn to exaggerate the differences of the resultant vectors at the ports so that phase determination can be more clearly indicated. Of crucial significance in the three-port system is the determination of the angle φ which is the phase difference between the vectors (port 1–port 2) and (port 2–port 3). The indicated phase difference of 90° is proportional to the relative radial velocity of the first mover target which generated the returns at the three ports.

The true azimuth position of the target also depends upon this phase angle. In the event that the boresight of the antenna is coincident with the true azimuth position, the phase angle will be 90° as indicated in FIG. 4. Accordingly, the first mover target discussed herein lies along the boresight of the antenna which generated the first mover returns at ports 1, 2 and 3.

In an implementation of the three-port system as shown in FIG. 6, the signals at ports 1, 2, and 3 undergo separate spectral processing employing the mentioned Fast Fourier Transform (FFT) at blocks 10, 12 and 14. Vector subtraction of port 1-port 2 occurs in vector subtractor 16 while the vector subtraction for port 2-port 3 occurs in vector subtractor 18. A phase processor 24 determines the phase angle from the subtracted vector inputs at 20, 22. The output from phase processor 24 undergoes computing at 26 to determine the relative radial velocity and azimuth position by computations well known in the art.

In order to better illustrate the technique of the three-port system, a second mover or target will now be discussed, this mover not being at the boresight of the antenna as was the case with the first mover. FIGS. 1C, 2C and 3C illustrate the four-pulse-return vector diagram of the second mover only, in the absence of clutter, before and after spectral processing by means of Fast Fourier Transforms. The resultant vector diagrams of the second mover plus clutter, after processing, is respectively indicated for each port in FIGS. 1E, 2E and 3E. These latter-mentioned resultant vectors are employed in the vector diagram of FIG. 5 where the vectors from ports 1, 2 and 3, for the second mover, are illustrated with the second mover resultant vectors for (port 1–port 2) and (port 2–port 3). As in the case of the first mover, FIG. 6 accomplishes the latter-mentioned vector subtractions; and phase detector 24 determines the phase angle illustrated in FIG. 5 which again is determinative of target relative radial velocity and true azimuth position. In the situation shown in FIG. 5, the angle is no longer 90° which would be in line with boresight, as was the case of the first mover as shown in FIG. 4. For the second mover shown in FIG. 5, the phase angle indicates a true azimuth position which is off boresight and represents a relative radial target velocity different from that of the first mover (FIG. 4).

The moving targets are detected in ports 1, 2 and 3. They are detected in a Doppler bin proportional to their true azimuth position plus their relative radial velocity. The phase shift between port 1-port 2 and port 2-port 3 is equivalent to a Doppler bin that is matched to the phase shift between these vectors. This is proportional to the relative radial velocity.

The true target azimuth position is proportional to the phase difference due to its azimuth position. This is an equivalent Doppler bin. The true azimuth position is proportional to the Doppler bin of the detected target in port 1, 2, 3 minus the equivalent Doppler bin of the relative radial velocity. The result of the three-port system is the detection of a moving target and measurement by prior art techniques of various target parameters such as relative radial velocity, true azimuth position and even amplitude and range.

In order to gain a better appreciation between the various Doppler parameters and measured characteristics of a moving target, the overall relationship of velocity quantities may be expressed as:

$$V_{DT}=V_D+V_{DA}$$

where $V_D$ equals Doppler due to target relative radial velocity of target to radar antenna;

$V_{DA}$ equals Doppler due to relative radial velocity due to a radar return existing at an angle relative to the boresight of an antenna;

$V_{DT}$ equals $\Delta\phi/\Delta t$.

The vector subtraction previously discussed yields the value of $\Delta\phi$ and $V_{DT}$ is the total Doppler detected by the spectral processor 10 as indicated in FIG. 6. The original equation may then be transformed as follows:

$$V_{DA}=V_{DT}-V_D.$$

Inasmuch as the quantities on the right side of the equation are known, the quantity $V_{DA}$ may be solved. In order to further solve for azimuth position, it is necessary to consider the expression:

$$V_{DA}=\frac{2V}{\lambda}\sin\theta$$

Having solved for $V_{DA}$ and being able to obtain the velocity of the aircraft (V) which carries the radar platform, further knowing the wavelength of the radar transmitted frequency, it is a straightforward matter to compute θ which is the angular deviation of the target from the boresight of the antenna indicated at reference numeral 30 in FIG. 6.

BRIEF DESCRIPTION OF THE PRESENT INVENTION

The present invention is directed to a two-port clutter suppression interferometry system which is capable of attaining approximately the same results as a three-port system. However, as a consequence of the two-port system implementation, one less antenna is required along with a third less hardware associated with it; and there is a significant reduction in the complexity and cost as well as an increase in inherent reliability.

In the present invention only two antenna ports are employed; and basically, the same functions are performed on the two ports as were performed in the case of the prior art three-port system. Each port of the radar data is spectrally processed, by conventional means such as Fast Fourier Transforms. The results are monitored for a pattern of points where clutter returns are replaced by very low level signals (black hole) indicating movement of a target to the point where clutter was previously generated.

BRIEF DESCRIPTION OF THE FIGURES

The above-mentioned objects and advantages of the present invention will be more clearly understood when considered in conjunction with the accompanying drawings, in which:

FIGS. 1A, 2A and 3A are vector representations of clutter at three separate ports of the prior art system;

FIGS. 1B and 1C are vector representations of a first and second target, respectively, at a first port of a prior art system;

FIGS. 2B and 2C are vector representations of a first and second target, respectively, at a second port of a prior art system;

FIGS. 3B and 3C are vector representations of a first and second target, respectively, at a third port of a prior art system;

FIGS. 1D and 1E are vector representations of first and second targets, respectively, at a first port of the prior art system;

FIGS. 2D and 2E are vector representations of first and second targets, respectively, at a second port of the prior art system;

FIGS. 3D and 3E are vector representations of first and second targets, respectively, at a third port of the prior art system;

FIG. 4 is a three-port vector diagram of a prior art system for a first target;

FIG. 5 is a three-port vector diagram of a prior art system for a second target;

DETAILED DESCRIPTION OF THE PRESENT INVENTION

Figure 6:
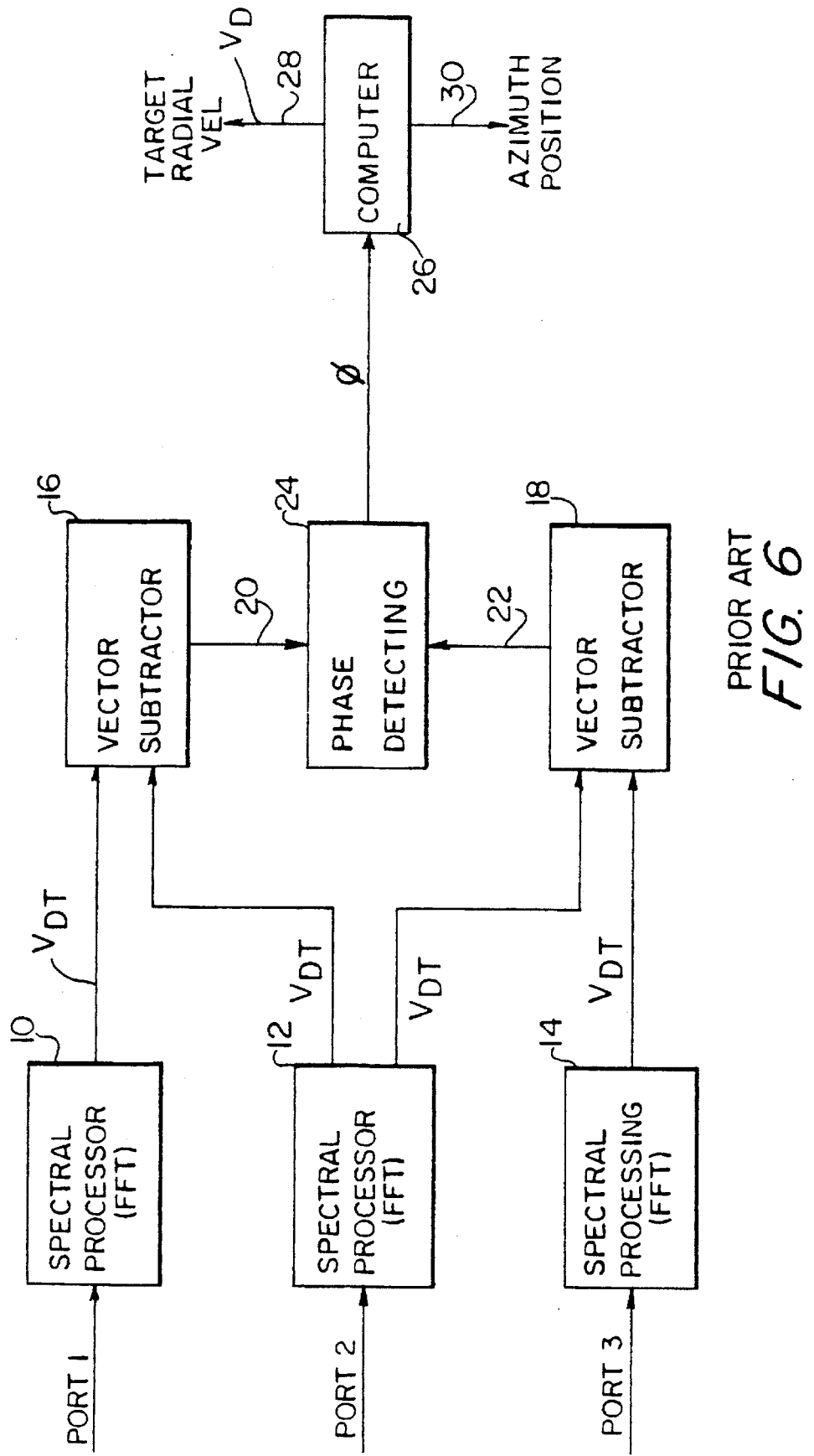
FIG. 6 is a block diagram of a prior art three-port system.

The concept and implementation of the present two-port system should be clear now that the prior art three-port system has been fully discussed. In the two-port system of the present invention, data is gathered at the ports and spectrally processed so that the received radar signals are transformed into Doppler-range bins which is a conventional technique. If clutter is present in the received signal, the radial velocity of a detected target cannot be determined. The present invention offers a method and apparatus to measure the radial velocity and the azimuth position of the detected target in the presence of clutter; and this requires additional information.

The present invention relies upon a phenomena for measuring relative radial velocity, namely, the fact that for an instant every target detected leaves a signal "black hole" in the form of a lack of signal, at the azimuth position of the target due to small radar returns from the position of where the target is, during this instant. To illustrate this, reference is made to FIG. 7 wherein a diagrammatic profile of a moving target is shown. Reference numeral 40 indicates radar waves impinging upon a moving target at an initial position 1 by 42. Due to the angular inclination of the radar waves 40, a volume of space behind the moving target 42 is shielded from detection. This is referred to as shadow 44. After the target has undergone tangential and radial velocity in the directions indicated, the displaced target and its shadow are indicated at point 2 by 46 and 48, respectively. Thus far, the physical situation between the impinging radar waves and the actual target have been discussed. However, the detected target appears at positions 50 and 52, corresponding with previously mentioned target positions 42 and 46. This is due to the fact that the appearance of the target in radar Doppler is displaced from the actual physical position of the target due to the relative motion between the target and a searching vehicle, such as an aircraft. When the target is detected, there is no signal information with respect to a shadow.

Figure 7:
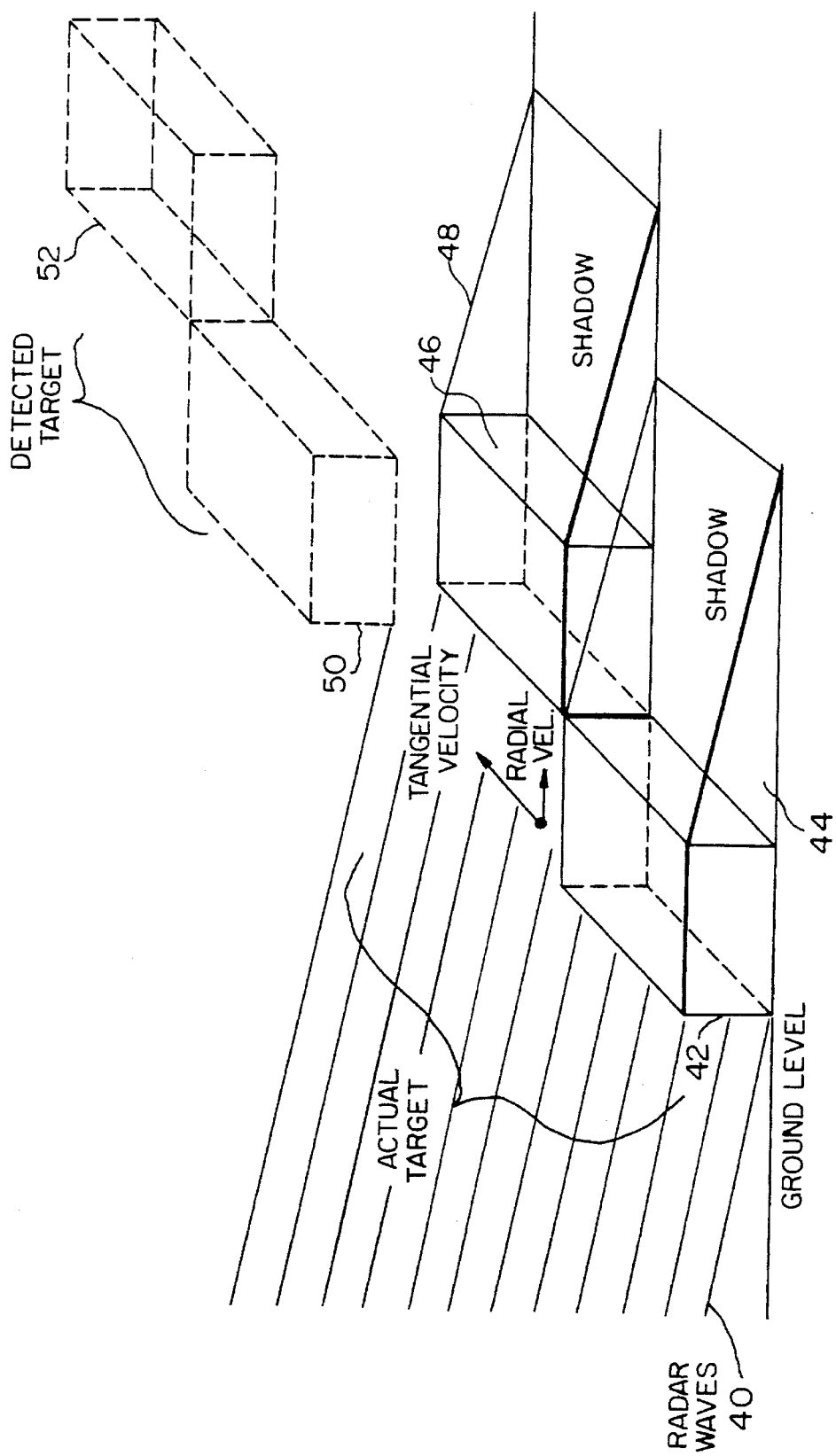
FIG. 7 is a diagrammatic view of a moving target profile.
Figure 8A:
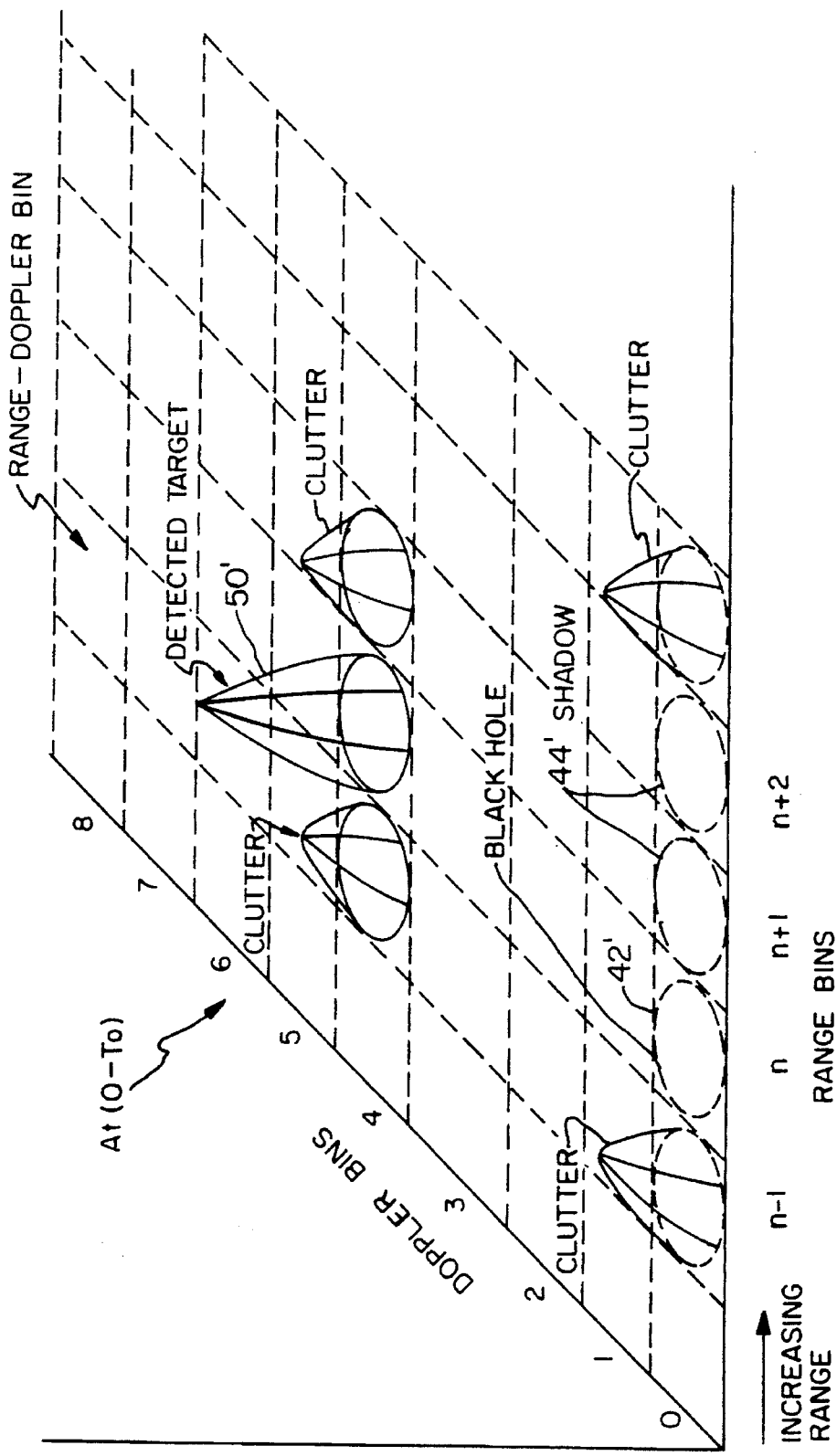
FIG. 8A is a moving target profile during a first moment of time.
Figure 8B:
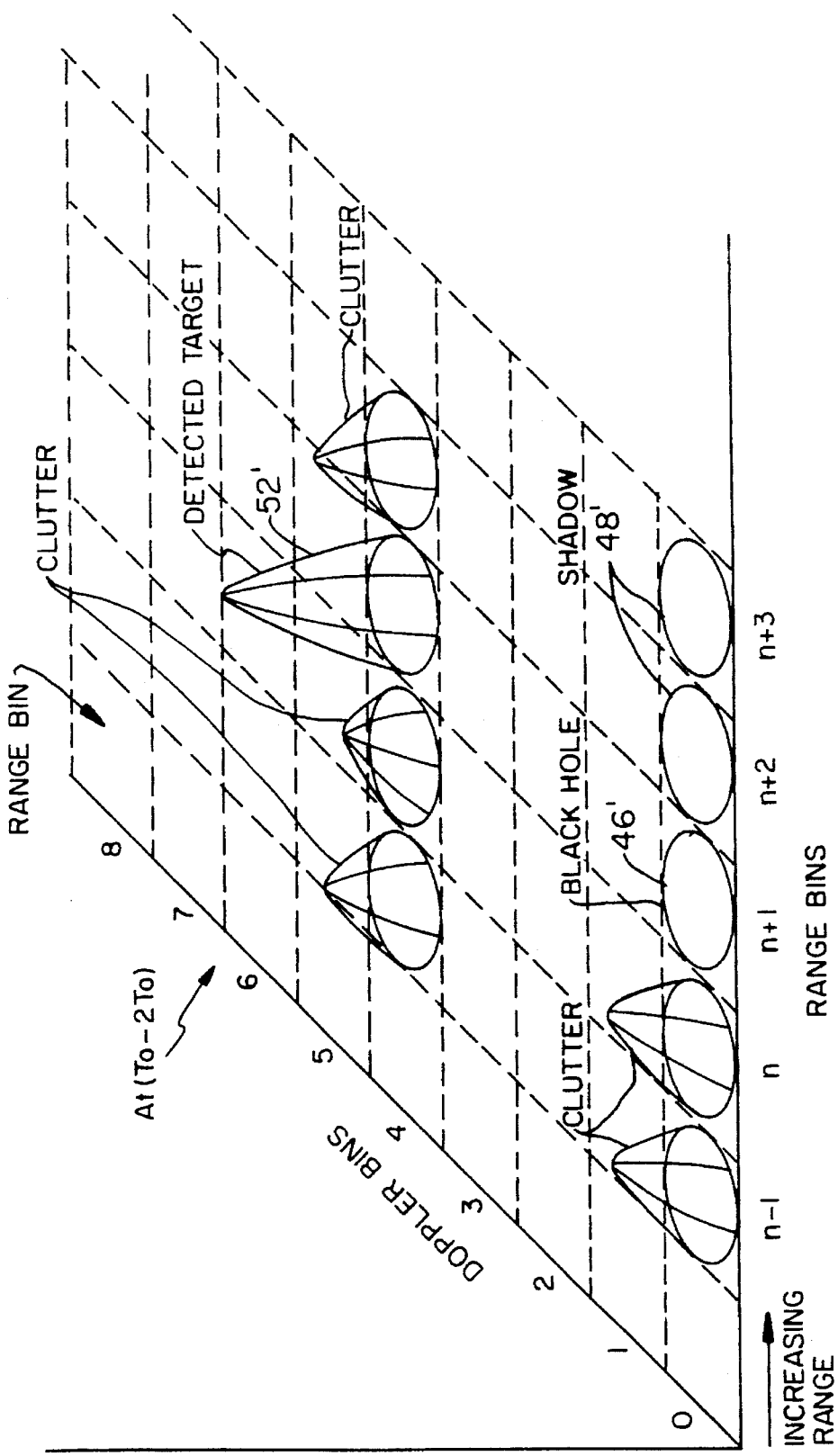
FIG. 8B is a moving target profile during a second moment of time.

Considering FIG. 7 in greater detail, at a first instant of time when the target is at 42, clutter will be detected at position 46 and there will be a lack of a signal at 42 (black hole) due to the presence of the target which masks clutter from that initial position. When the target moves to 46, clutter will appear at the previous position 42 and the black hole will appear at 46, again accompanied by the masking of clutter. Accordingly, the black hole moves with the target; and of course, the target shadow moves with the target. The essence of the method of the present invention is the recognition that when the target moves to either a new Doppler bin or range bin, or both, not only does the shadow follow the motion but the clutter will decrease substantially at the position to where the target has moved and vice versa will appear at the position from where the target has left. FIGS. 8A and 8B illustrate target profiles during two consecutive moments of time when a target moves from one position to the next under constant radial velocity conditions.

FIG. 8A is a range-Doppler bin diagram which indicates a signal for a detected target 50', corresponding to the detected target 50 shown in FIG. 7. Adjacent bins indicate clutter signals. The actual position of the target occurs where there is no signal detection (black hole), as indicated by 42', corresponding to the actual target position 42 of FIG. 7. Clutter signals are located in bins adjacent to the actual target position bin 42' and the target shadow bins (44') corresponding to range bins n+1 and n+2.

In summary, during this first instant of time, the bin positions of target, black hole and shadow are as follows:

|  | Detected Target | Actual Target (Black Hole) | Shadow |
| --- | --- | --- | --- |
| Range Bin | n | n | n + 1 and n + 2 |
| Doppler Bin | 4 | 0 | 0 |

FIG. 8B is a view similar to that of FIG. 8A except at a second instant of time. Viewing the range-Doppler bins, it will be noticed that clutter now appears in the range-Doppler bin where target 50' previously existed. Instead, the detected target now appears at range bin (n+1) and is indicated as 52', to correspond with detected target 52 of FIG. 7. The range bins adjacent to the signal of detected target 52' are clutter signals. Viewing the lower part of the range-Doppler bins in FIG. 8B, it will be noted that the actual position of the target has moved to range bin n+1 from the previous range bin n showed in FIG. 8A. A clutter signal now characterizes the range bin previously occupied by the actual target position. The new actual target position 46' corresponds to that shown in FIG. 7. As in the case of the first instant of time discussed in connection with FIG. 8A, the shadow positions of the second moment in time (FIG. 8B) are located at two right range bins (n+2) and (n+3) adjacent the actual target position (hole) and these shadow positions are indicated by reference numeral 48' to correspond with 48 in FIG. 7

The range-Doppler bin situation for the second instant of time may be summarized as follows:

|  | Detected Target | Actual Target (Black Hole) | Shadow |
| --- | --- | --- | --- |
| Range Bin | n + 1 | n + 1 | n + 2 and n + 3 |
| Doppler Bin | 4 | 0 | 0 |

The first instant of time $(0-T_0)$ corresponds to a first aperture of a two-port system, while the second instant $(T_0-2T_0)$ corresponds to a second aperture of the two-port system. However, it should be understood that multiple apertures may be employed.

As illustrated in FIGS. 8A and 8B, the present invention relies upon the detection of a black hole Doppler signal, indicative of target and shadow, and the Doppler signal of the detected apparent target in each antenna port. The Doppler signal of the black hole is proportional to the azimuth position of the target. The difference in Doppler signals from the detected target and the black hole is a Doppler signal which is proportional to the relative radial velocity of the target.

If the present discussion were extended to target profiles of targets with constant tangential velocity, it would be found that such targets do not exhibit change in range per aperture for either detected target, clutter or black hole. The change will be along a Doppler bin axis due to a change in target azimuth position. The degree of change along the Doppler bin axis for the black hole, clutter and detected target will be equal.

Figure 9:
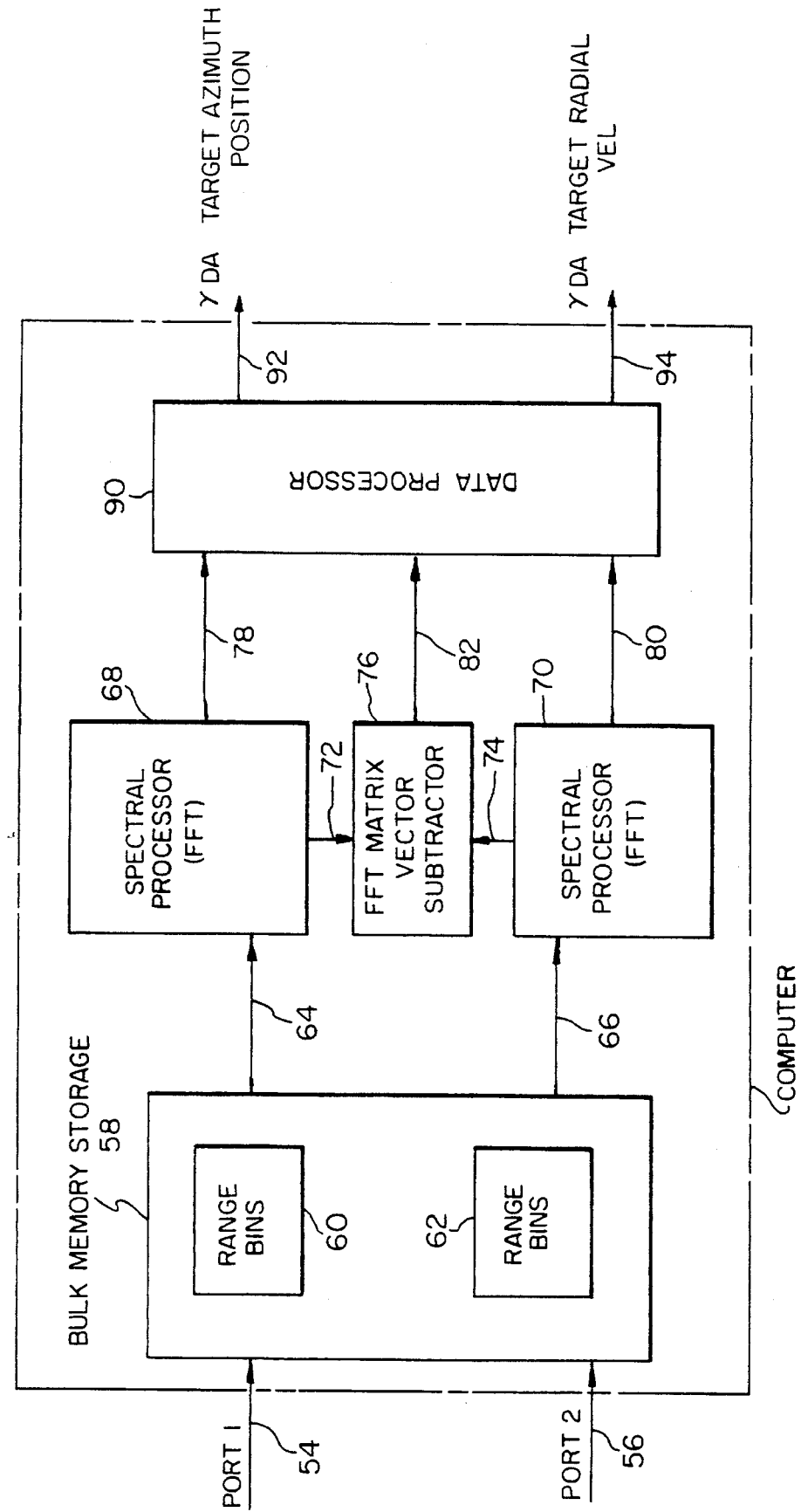
FIG. 9 is a block diagram of the present invention.

Referring to FIG. 9, in operation of the present invention, a radar return at port 1 is indicated at reference numeral 54 while the return at port 2 is indicated at reference numeral 56. A bulk memory storage 58 stores the input data from the two ports in respective range bins 60 and 62 which are correlated with pulse repetition intervals of the radar, in a manner well known in the prior art. Range bin information is conveyed via lines 64 and 66 to respective spectral processors 68 and 70 which, by way of example only, may perform spectral processing by well-known fast Fourier transforms (FFT). The spectral processing creates a matrix for each port of range bins relative to Doppler bins. FFT matrix vector subtraction occurs at subtractor 76 after spectrally processed information is transferred from processors 68, 70 to the subtractor 76 via lines 72 and 74, thus resulting in the subtraction of corresponding range-Doppler bins of port 1 and port 2. When the vector subtraction results in a value above a preselected threshold, a potential mover has been detected. Thus far, each of the blocks illustrated in FIG. 9 may be implemented in a digital computer by a program established in a straightforward manner after knowledge of the present invention has been gained, as explained thus far. The same digital computer may have a data processor for computing, as indicated by reference numeral 90. Spectral data from ports 1 and 2 are respectively connected from spectral processors 68 and 70 to the data processor 90. The spectral data for a potential detected target is processed. A black hole is searched for in the same range bin as the detected target. As previously explained, a black hole is the lack of a sufficient signal and this is detected for each Doppler output in the range bin of the detected target. The potential moving target is therefore associated with the potential black hole. The range Doppler bin before and after the range Doppler bin of the detected target and black hole is then interrogated and the value thereof is measured and stored. Each aperture ($0-T_0$, $T_0-2T_0$, etc.) is measured in the same manner and the rate of change of a detected target in the same range bin is determinative of total Doppler velocity which includes an azimuth component and a radial velocity component, as previously indicated. The rate of change of the black holes, along the same range bin, is indicative of target azimuth position relative to the boresight of the antenna. Having these variables the radial velocity component is determined by simple vector subtraction. The desired measurement of target azimuth position and radial velocity are respectively indicated at reference numerals 92 and 94 in FIG. 9.

Targets that are not detected targets in either port 1 or port 2, but which exceed a threshold value provide useful information. Namely, the change in Doppler from aperture to aperture in such a situation is equivalent to the tangential velocity of a target exhibiting only this type of motion.

Targets that are not detected targets in either port 1 or port 2, but which exceed a threshold also provide useful information. Namely, the change in range from aperture to aperture in this situation is equivalent to the blind velocity of a target exhibiting only this type of motion.

It should be understood that the invention is not limited to the exact details of construction shown and described herein for obvious modifications will occur to persons skilled in the art.

I claim:

1. In a two-port synthetic aperture Doppler radar system, a method for detecting a moving target comprising the steps of detecting the absence of a radar signal return at a point, at a first instant of time;

subsequently detecting a change of signal level, from the point, to a clutter signal indicative of movement of the target;

storing a series of points at which the changed signal level occurs;

detecting signals from an apparent target at each port;

measuring the difference of the signals from the apparent target and an actual moving target; and processing said signals and said difference of said signals by searching for a black hole in the same range bin as the detected target, the potential moving target being associated with the potential black hole, by interrogating the range Doppler bin before and after the range Doppler bin of the detected target and black hole and measuring and storing the value thereof and measuring each aperture in the same manner, the rate of change of a detected target in the same range bin being determinative of total Doppler velocity which includes an azimuth component and a radial velocity component thereby determining the radial velocity of the actual target relative to the two ports.

2. A method as claimed in claim 1, wherein determination of said radial velocity component is by simple vector subtraction.

3. A two-port synthetic aperture radar system for detecting a moving target, said system comprising means for storing Doppler target returns from first and second ports;

first and second means connected at their inputs to the outputs of the storing means for separately spectrally processing the respective returns from the first and second ports and generating corresponding vector information therefrom;

matrix means connected at its inputs to the separate outputs of the first and second spectral processing means for subtracting the vector information from each other; and means connected at its inputs to the outputs of the spectral processing means and the matrix means for generating information regarding target azimuth position and target radial velocity by searching for a black hole in the same range bin as the detected target, the potential moving target being associated with the potential black hole, by interrogating the range Doppler bin before and after the range Doppler bin of the detected target and black hole and measuring and storing the value thereof and measuring each aperture in the same manner, the rate of change of a detected target in the same range bin being determinative of total Doppler velocity which includes an azimuth component and a radial velocity component thereby determining the radial velocity of the actual target relative to the two ports.

4. A system as claimed in claim 3, wherein said means for spectrally processing the returns includes means for performing fast Fourier transforms thereon.

5. A system as claimed in claim 3, wherein said radial velocity is determined by simple vector subtraction in said means connected at its inputs to the outputs of said spectral processing means.

* * * * *